United States Patent [19]

Endo

[11] Patent Number: 4,799,899

[45] Date of Patent: Jan. 24, 1989

[54] CONNECTIVE STRUCTURE FOR CONDUCTIVE WIRES AND A METHOD OF MANUFACTURING THE SAME

[75] Inventor: Takayoshi Endo, Shizuoka, Japan

[73] Assignee: Yazaki Corporation, Japan

[21] Appl. No.: 927,514

[22] Filed: Nov. 6, 1986

[30] Foreign Application Priority Data

Nov. 6, 1985 [JP] Japan ............................ 60-169800[U]

[51] Int. Cl.$^4$ ................................................ H01R 5/04
[52] U.S. Cl. ..................................... 439/502; 439/874; 439/883
[58] Field of Search ............ 339/116 R, 116 C, 275 R, 339/275 T, 277 R; 439/502, 505, 874, 875, 883

[56] References Cited

U.S. PATENT DOCUMENTS

| | | | |
|---|---|---|---|
| 3,260,907 | 7/1966 | Weller et al. | 339/275 R |
| 3,717,842 | 2/1973 | Douglas, Jr. | 339/275 T |
| 3,842,487 | 10/1974 | Hartz | 339/275 T X |

FOREIGN PATENT DOCUMENTS

| | | | |
|---|---|---|---|
| 846382 | 7/1970 | Canada | 339/275 R |
| 2442954 | 3/1976 | Fed. Rep. of Germany | 439/883 |
| 2824463 | 1/1979 | Fed. Rep. of Germany | 339/116 R |
| 549199 | 2/1983 | France | 439/883 |

*Primary Examiner*—Z. R. Bilinsky
*Attorney, Agent, or Firm*—Wigman & Cohen

[57] ABSTRACT

A connective structure of a plurality of conductive wires which is constructed by removing the insulation covering on one end of each of a plurality of conductive wires, arranging their ends and forming a terminal section by pressure bonding the ends into a united body. The structure is suited for providing a large number of branch wires, and in particular, it has a strong resistance to external forces in the direction of pulling so that the conductive wires will not come off. Additionally, protective coverings are attached to reinforce the boundary section between the conductive wires and the terminal section.

8 Claims, 3 Drawing Sheets

FIG. 3
FIG. 4
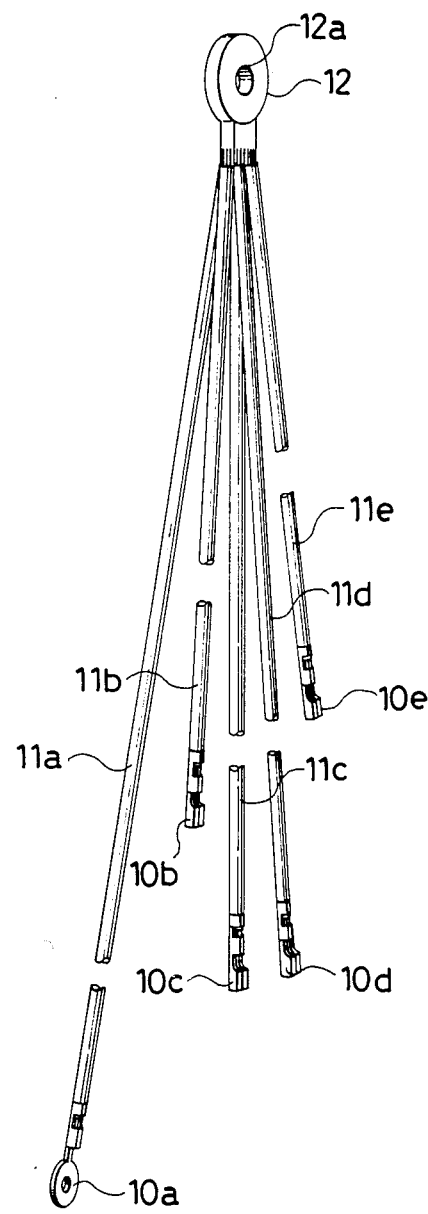
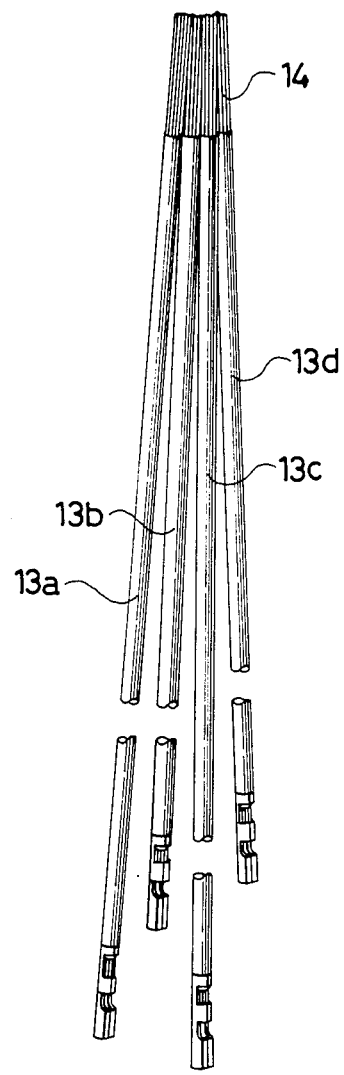

CONNECTIVE STRUCTURE FOR CONDUCTIVE WIRES AND A METHOD OF MANUFACTURING THE SAME

BACKGROUND OF THE INVENTION

1. Field of the Invention

The present invention relates to a connective structure for conductive wires, and a method of producing the same, and more specifically to a connective structure for a branch point of conductive wires such as a wiring harness that has numerous branch points, and a method of producing the same.

2. Description of the Prior Art

In providing a plurality of branch conductive wires for one main conductive wire in a wiring harness or the like, for the ease in the connecting work, it was usual in the past to remove the insulation covering from both of the conductive wires to be connected, and to connect both of the conductive wires mutually under pressure by the use of a metallic pressure-binding fitting for a terminal or the like. Namely, connection was done, for example, by connecting a plurality of branch conductive wires 2a, 2b, 2c in a bundle, thereafter connecting the bundled wires to the end of a main wire 1 by the use of a metallic pressure-binding terminal fitting 3, as shown in FIG. 1, or by removing the insulation covering of the required portions of the main conductive wire 4, and by binding the ends of the branch conductive wire pairs (5a, 5b), (5c, 5d), and so on under pressure by the use of the metallic pressure-binding terminal fittings 6a, 6b, and so on, as shown in FIG. 2.

However, in such a connection method that makes use of metallic pressure-binding terminal fittings, there exist restrictions on the size, shape, and so forth of the metallic pressure-binding terminal fitting, so that it is possible to handle only up to 2 to 3 conductive wires. Because of this, in providing a large number of branch conductive wires, there was a drawback that the processing steps had to be increased and the workability was unsatisfactory. In addition, although the connection method which makes use of such a metallic pressure-binding terminal fitting is simple and easy, there are problems that the conductive wires tend to come off due to dispersion in the pressure-binding force and there is an increase in the contact resistance in the junction point due to oxidation during the use.

SUMMARY OF THE INVENTION

The main object of the present invention which was conceived with the above problems in mind, is to provide a connective structure of conductive wires that has a high reliability and a high productivity in manufacturing conductive wire bundles that have a large number of branches.

Another object of the present invention is to provide, in a connective structure that uses metallic pressure-binding terminal fittings, a connective structure of conductive wires which can prevent the tendency of the conductive wires to fall off due to dispersion in the pressure-binding force of the fittings.

A further object of the present invention is to provide, in a connective structure of conductive wires which uses metallic pressure-binding metallic fittings, a connective structure that can prevent an increase in the contact resistance due to oxidation during the use of the junction points.

Still another object of the present invention is to provide a method of manufacturing a connective structure of conductive wires which can achieve the above objects with an extremely simple structure and process.

In order to achieve the main object in the above, the connective structure of conductive wires in accordance with the present invention is formed by binding one end of a plurality of conductive wires together and shaping them under pressure so as to construct a single terminal.

Further, a method of manufacturing the connective structure of conductive wires in accordance with the present invention comprises a step of binding together a plurality of conductive wires to remove the insulation covering on one end of each of the wires, a step of arranging their ends, and a step of housing the ends placed parallel in a frame for molding and mold them under pressure.

According to the present invention with the above features, connection of even ten or so branches becomes realizable, which is a great improvement in comparison to two or three branches that can be connected by the existing method that utilizes metallic pressure-binding terminal fittings. In addition, the contact resistance can be reduced sharply and the connective strength can be increased, and a connection of high reliability that has no deterioration in time can be accomplished. Furthermore, the number of branch points can be made small so that not only the productivity of the conductive wire bundles can be enhanced, but also the workability in installing the wirings can be improved.

These and other objects, features and advantages of the present invention will be more apparent from the following description of preferred embodiments, taken in conjunction with the accompanying drawings.

BRIEF DESCRIPTION OF THE DRAWINGS

FIG. 3 is a perspective view which shows an embodiment of the connective structure of conductive wires in accordance with the present invention, FIG. 4 is a perspective view which shows the bundle of conductive wires prior to the connection in accordance with the above embodiment.

DETAILED DESCRIPTION OF THE PREFERRED EMBODIMENT

Figures 1, 2:
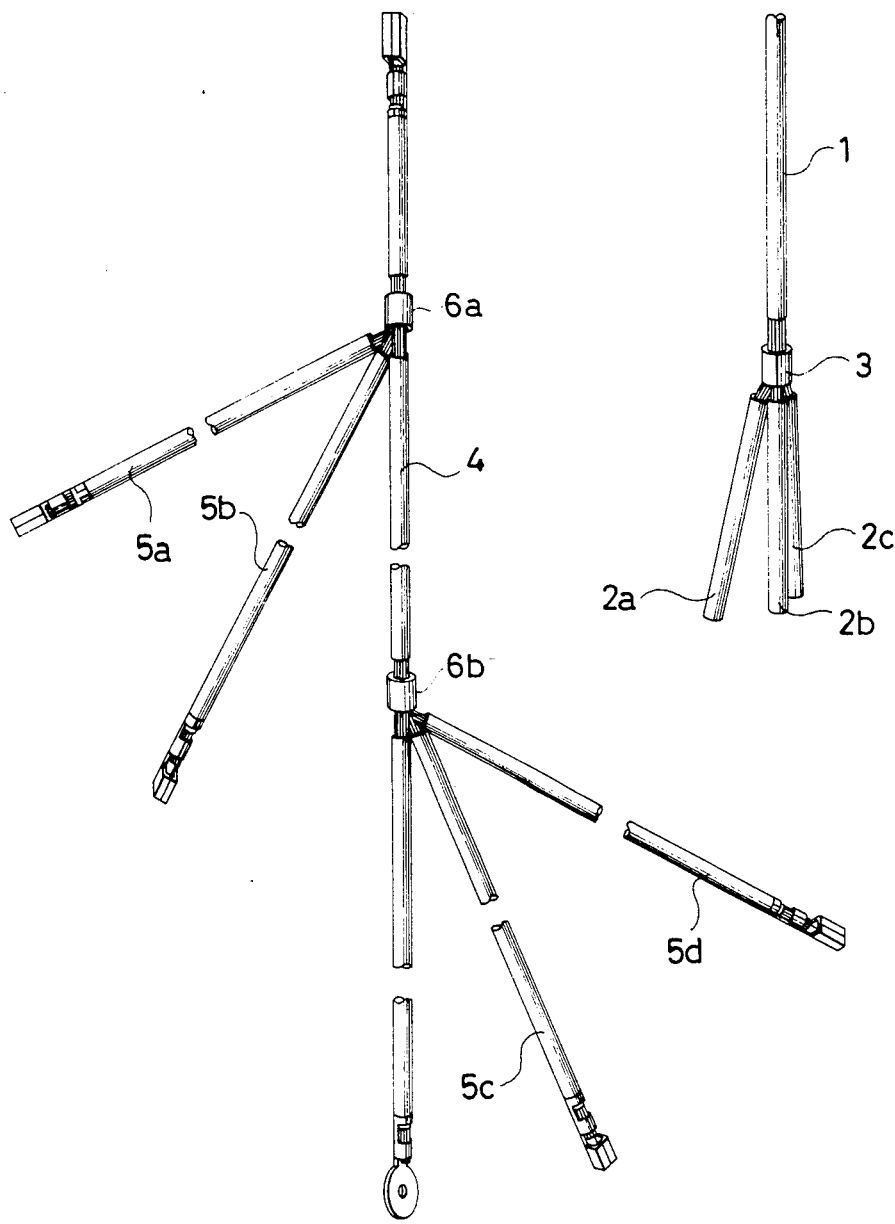
FIG. 1 and FIG. 2 are perspective views which illustrate the prior art of the present invention.

In FIG. 3 which shows an embodiment of the connective structure of conductive wires in accordance with the present invention, the ends of a plurality of conductive wires 11a, 11b, 11c, 11d, and 11e that have connective metallic fittings 10a, 10b, 10c, 10d, and 10e, respectively, on the other ends are bundled together into one, where there is formed an annular terminal section 12.

As the shape of such a terminal, there may be adopted appropriate shapes such as one with an annular form, as shown in FIG. 3, that has a hole 12a therein which is suited for fastening with a screw, and one with tube form which is suited for installing and holding on a fixture.

In forming such a terminal section 12, as shown in FIG. 4, a plurality of conductive wires 13a, 13b, 13c, and 13d are bundled together to remove the insulation covering on one end of each wire, and their ends 14 are arranged into one. Next, the ends 14 are inserted to a pressure molding anvil for terminal, and welding is completed by molding them into a united body by pressurizing them from top and from down below by the use of an ultrasonic pressure bonding machine or the like. Here, various kinds of pressure bonding means may be employed for such pressure molding, and also, molding may be carried out in combination with metallic powder or metallic plates that accelerates the bonding by melting to fill the gaps among the conductive wires or cover the surface of the wires.

Figure 5:
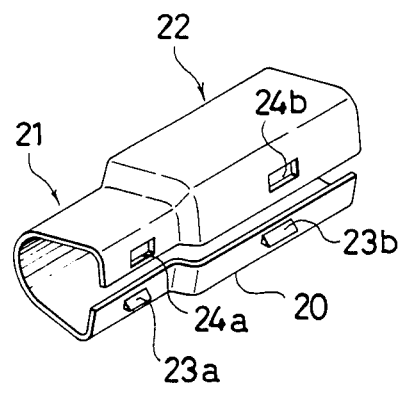
FIG. 5 is a perspective view which shows an embodiment of the protective cover for connective structure of conductive wires in accordance with the present invention.
Figure 6:
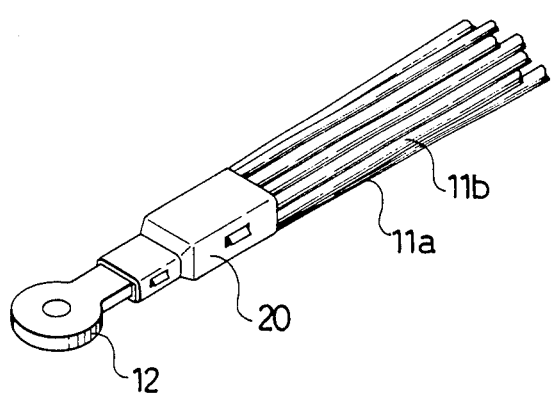
FIG. 6 is a perspective view which shows the state in which the protective covering is fitted.

The terminal section 12 thus formed is a united body so that separation of the conductive wires will not take place. However, the boundary between the terminal section 12 and the conductive wires was subjected to strong strains during pressure bonding so that the region between the terminal section 12 and the conductive wires is sometimes vulnerable to bending or the like. For this reason, it is desirable to protect the region from external forces by covering the boundary portion with a protective covering like 20 or 30 made of synthetic resin. The covering 20 is formed into a substantially cylindrical form that has a small diameter section 21 which houses the boundary section and a larger diameter section 22 which houses the insulation covered section of the conductive wires, as shown in FIG. 5. The cover 20 has a portion which is cut in the axial direction, and a part of the covering 20 is arranged to overlap at the cut area. In the overlapping section, there are provided engaging projections 23a, 23b and engaging windows 24a, 24b. As shown in FIG. 6, the covering 20 is installed in the state of housing the conductive wires 11a, 11b..., and so on by engaging the engaging projections 23, 23 with the engaging windows 24a, 24b.

Figure 7:
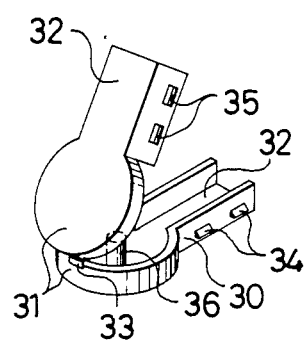
FIG. 7 is a perspective view which shows another embodiment of the protective cover for connective structure of conductive wires in accordance with the present invention.
Figure 8:
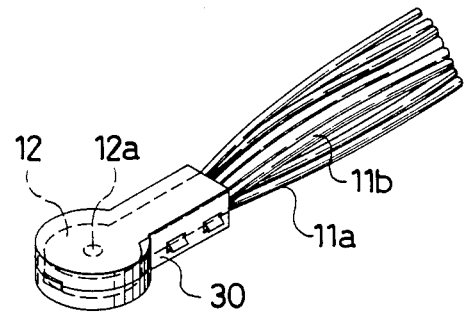
FIG. 8 is a perspective view in which the protective covering in FIG. 7 is fitted.

Further, the covering 30 consists of a cylindrical section 31 which houses the terminal section 12 and a box-shaped section 32 which houses the boundary section between the terminal section 12 and the conductive wires, as shown in FIG. 7. The covering 30 is separated horizontally into two of upper and lower sections, and is constructed so as to be opened and closed by a hinge that is provided at a part of the cylindrical section 31. The box-shaped section 32 is formed so as to overlap on its side surfaces, and on both overlapping surfaces there are provided engaging projections 34, 34 and engaging windows 35, 35, similar to the cover 20. As shown in FIG. 8, the covering 30 is installed by housing the terminal section 12 and the boundary section between the terminal section and the conductive wires 11a, 11b..., and so on, in the state in which the center hole 12a of the terminal section 12 is fitted to a projection 36 that is provided within the cylindrical section 31, and by engaging the engaging projections 34, 34 with the engaging windows 35, 35.

When the boundary section and/or the terminal section is covered with coverings 20, 30, even if there is applied external forces to these sections, there will be no bending or forces acting in the tearing direction. Further, it is possible to prevent oxidation of the boundary section and the terminal section.

The connective structure which has covering 20 where the terminal section is exposed as shown in FIG. 6, is suited for handling a bundle of conductive wires such as the ground wiring in which it is fixed by a screw directly to the body of the vehicle and the case of branching off a large number of wirings from one power supply terminal. On the other hand, the connective structure that has a covering 30 which covers completely the terminal section 12, as shown in FIG. 8, has a sufficiently insulated junction, and is suited, for example, for taking out a large number of branch lines from one principle line, so that it may be used in the general insulated signal circuit or electrical circuit.

It will be apparent from the foregoing description that the connective structure of conductive wires of the present invention has a number of advantages, some of which have been described above. Also, obvious modifications and variations can be made to the connective structure of the present invention without departing from the scope of the invention. Accordingly, the scope of the invention is not limited as necessitated by the accompanying claims.

What is claimed is:

1. A connective structure for wires, comprising:
   a plurality of insulated conductive wires each having a stripped end, the stripped ends being bundled together;
   a solid metallic compound applied to the bundle ends such that any empty spaces between the bundled ends are filled by the metallic compound, whereby oxidation and corrosion will be prevented and bonding strength improved therebetween; and
   a single terminal integrally formed on the bundle ends by bonding.

2. The connective structure of claim 1, wherein the bonding includes pressure-bonding.

3. The connective structure of claim 1, wherein the pressure-bonding includes untrasonic pressure-bonding.

4. The connective structure of claim 1, wherein the bonding includes spot welding.

5. The connective structure of claim 1, wherein the terminal is formed into a ring-like structure that has a through hole therein.

6. The connective structure of claim 1, wherein a cover is provided at the boundary section between the terminal and the wires so as to reinforce the connective structure.

7. The connective structure of claim 1, wherein the cover is made of synthetic resin.

8. The structure of claim 1, wherein the cover is constructed so as to cover the terminal as well.

* * * * *

UNITED STATES PATENT AND TRADEMARK OFFICE
CERTIFICATE OF CORRECTION

PATENT NO. : 4,799,899
DATED : January 24, 1989
INVENTOR(S) : TAKAYOSHI ENDO

It is certified that error appears in the above-identified patent and that said Letters Patent is hereby corrected as shown below:

IN THE CLAIMS:

Claim 3, line 1, "claim 1," should be --claim 2,--.

Claim 5, line 1, "claim 1," should be --claim 3,--.

Claim 6, line 1, "claim 1," should be --claim 5,--.

Claim 7, line 1, "claim 1," should be --claim 6,--.

Claim 8, line 1, "claim 1," should be --claim 7,--.

Signed and Sealed this

Fifth Day of September, 1989

Attest:

DONALD J. QUIGG

*Attesting Officer*   *Commissioner of Patents and Trademarks*